Aug. 9, 1966     R. E. STURDIVAN     3,265,937
ELECTRICAL DISTRIBUTION BOX AND NEUTRAL
Filed Dec. 9, 1963
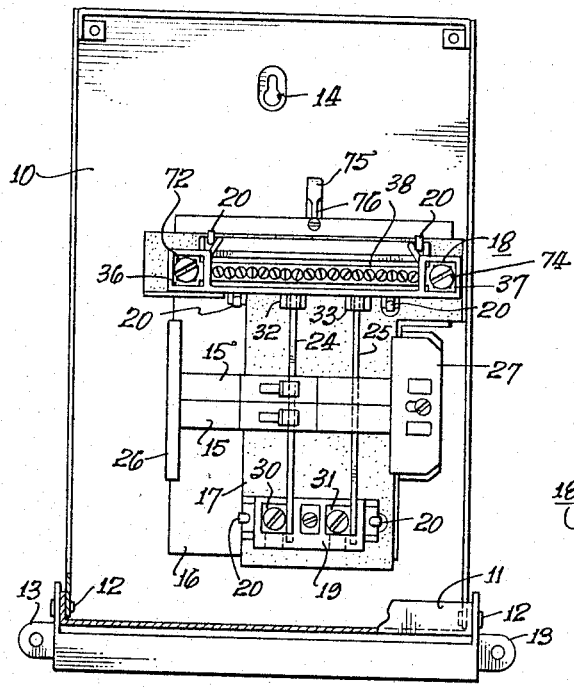
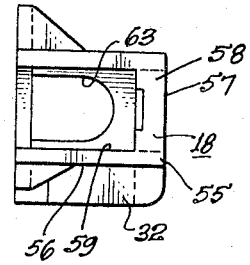
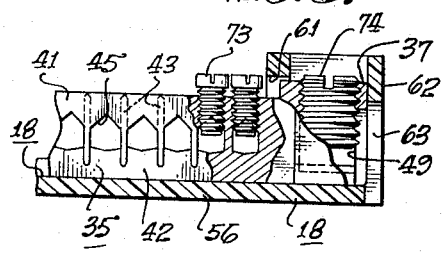
Rex E. Sturdivan,
INVENTOR.
BY HIS ATTORNEYS.
Harris, Kiech, Russell & Kern

United States Patent Office 3,265,937
Patented August 9, 1966

3,265,937
ELECTRICAL DISTRIBUTION BOX AND NEUTRAL
Rex E. Sturdivan, Fullerton, Calif., assignor to Zinsco Electrical Products, Los Angeles, Calif., a corporation of California
Filed Dec. 9, 1963, Ser. No. 329,148
10 Claims. (Cl. 317—119)

This invention relates to electrical distribution boxes and to neutral terminals for use therein.

An electrical distribution box provides for distributing and controlling electric power from an incoming line to a plurality of loads. A typical distribution box will have a pair of bus bars, each connected to a hot conductor of a three-wire incoming line, and a third bus or neutral fed from the neutral conductor of the three-wire line. Provision is made in the distribution box for connecting a plurality of switch and fuse combinations or circuit breaker switches between the bus bars and the hot conductors of the loads. Provision is also made for connecting the neutral conductor of each load to the neutral terminal.

Distribution boxes should be inexpensive, rugged, easily assembled, installed and wired, and safe in operation. The costs of distribution boxes are strongly affected by the number of parts incorporated in the assembly and the amount of conductor material utilized, copper and aluminum of electrical grade being relatively expensive.

It is an object of the present invention to provide a new and improved distribution box that is inexpensive, durable and easily assembled and one which incorporates relatively few parts. A particular object is to provide such a distribution box incorporating an insulator unit which supports and insulates the neutral terminal and also clamps the bus bars in position for engagement by the switches.

It is a particular object of the invention to provide a new and improved neutral terminal in the form of a unitary structure suitable for casting. A further object it to provide such a neutral terminal in the form of a single conductor providing for connection of the line neutral and a plurality of load neutrals thereto.

It is an object of the invention to provide a neutral terminal comprising a unitary conductor having first and second end portions and an elongate central portion, with the central portion including a pair of parallel side walls and a bottom wall and a series of transverse ribs defining screw openings therebetween, with the side walls having aligned transverse openings in communication with the corresponding screw openings. A further object is to provide such a structure wherein one of the end portions has parallel walls defining a screw opening having an axis parallel to the axes of the screw openings of the central portion, with at least one of the end portion walls having another opening in communication with the screw opening.

It is a specific object of the invention to provide such a neutral conductor in which the screw openings are square openings which do not require machining or thread cutting for receiving the wire clamping screws.

It is an object of the invention to provide an insulator for receiving and retaining the neutral conductor. A further object is to provide such an insulator in the form of a unitary element having first and second end sections and an elongate central section with one of the end sections having an opening aligned with the central section for slidingly receiving the conductor with the central and first and second end portions of the conductor disposed in the central and first and second end sections of the insulator, respectively. A particular object is to provide such a structure in which the neutral conductor is maintained in the insulator mount by means of one of the wire clamping screws of the conductor thereby eliminating the requirement for any separate mounting and installation means.

It is an object of the invention to provide such an insulator which also serves to support the bus bars in position in the distribution box.

The invention also comprises novel details of construction and novel combinations and arrangements of parts, which will more fully appear in the course of the following description. The drawings merely show and the description merely describes a preferred embodiment of the present invention which is given by way of illustration or example.

In the drawing:

FIG. 1 is a view of the front of an electrical distribution box with the cover open;

FIG. 2 is an enlarged top view of the neutral and insulator of the box of FIG. 1;

FIG. 3 is a partial sectional view taken along the line 3—3 of FIG. 2;

FIG. 4 is an end view taken along the line 4—4 of FIG. 2 with the neutral removed; and FIG. 5 is an isometric view of the neutral of FIG. 2.

Referring to FIG. 1, the distribution box includes a housing 10 comprising a bottom, four sides and an open top, and a cover 11 pivotally mounted on the housing by pins 12. Apertured lugs 13 and a screw opening 14 provide for mounting of the box on a suitable wall or other support structure.

The housing provides for the mounting of a plurality of circuit breaker switches 15 and for the connection of appropriate conductors thereto. Usually, the breaker mounts, terminals and other components are manufactured in a subassembly on a metal plate 16 and then mounted in the housing itself. A sheet of insulating material 17 overlies the metal plate 16 and insulator blocks 18, 19 are clamped against the sheet 17 by ears 20 of the metal plate 16. Bus bars 24, 25 are held in place by the insulator blocks 18, 19 and the breakers 15 are held in position on the bus bars by clips 26, 27 carried on the metal plate 16. A typical arrangement for breakers and breaker mounting clips may be seen in U.S. Patent No. 2,530,548.

A terminal block 30 with a wire clamping screw therein is carried on the bus bar 24 and a similar terminal block 31 is carried on the bus bar 25. The extreme end of the bus bar 24 adjacent the terminal block 30 is carried in a pocket formed in the insulator block 19 and the corresponding end of the bus bar 25 is carried in a similar pocket.

Bosses 32, 33 are formed integrally with the insulator block 18, each boss having the shape of a downwardly opening U for receiving the end of a bus bar 24, 25 and clamping the bus against the insulation sheet 17.

A neutral 35 in the form of a unitary metal member, preferably an aluminum casting, is carried within the insulator block 18. The neutral comprises end portions 36, 37 and an elongate central portion 38. The central portion is formed of parallel side walls 40, 41 and a bottom wall 42 with a series of transverse ribs 43. The side walls and transverse ribs define square openings 44 and transverse openings 45 are provided in the side walls in communication with the corresponding square openings 44. The four walls of the end portions 36, 37 also form square openings 48, 49. An aperture 50 in the end of the end portion 36 provides communication with the square opening 48. Similarly, an aperture 51 in the side of the end portion 37 provides communication with the square opening 49. The end portions preferably are larger than the central portion for handling larger conductors, but such size variation is not mandatory.

The neutral 35 is retained in the insulator block 18 which also serves to hold the bus bars 24, 25 in place. The insulator block 18 is a unitary molding of insulating material and includes a central section 55 having a bottom wall 56 and a side wall 57. An end section 58 of the insulator block 18 has an opening 59 in the end wall and a corresponding opening 60 in an interior wall for slidingly receiving the neutral 35. A similar opening 61 is provided in an interior wall of the other end section 62, permitting the neutral to be inserted into the block in the position shown in FIG. 2. A smaller opening 63 in the end wall of the end section 62 provides access to the interior of the end section 62. Opening 64 in the insulator block communicates with transverse opening 51 of the neutral.

The neutral is maintained in place within the insulator block by a screw 70 disposed in the square opening 44 adjacent the wall 71 of the insulator block.

In use, one hot conductor of the three-wire line is clamped in the terminal block 30 and the other hot conductor is clamped in the terminal block 31. The neutral conductor of the line is connected to the neutral 35, ordinarily by being positioned in the opening 50 and clamped by the screw 72. The hot conductors to the various loads are connected to the individual circuit breakers. The neutral conductors to the various loads are positioned in the transverse openings 45 of the neutral and are clamped in place by screws such as the screws 70, 73. A higher rating load neutral may be disposed in the transverse opening 51 and clamped by the screw 74. Of course, the line neutral conductor and the various load neutral conductors can be clamped in any of the transverse openings of the cast neutral 35. A flexible strap 75 (FIG. 1) is mounted in the housing 10 and has a cylindrical end 76 for positioning in one of the transverse openings 45 to provide a ground connection for the neutral.

One important feature of the neutral 35 is the provision of the square openings 44 in the central portion and similar square openings in the end portions which permit the use of threaded screws without requiring any tapping or machining operation on the neutral. The neutral preferably is a die cast structure using electrical grade aluminum and may be installed in the insulator block as it comes from the casting machine without requiring any intermediate drilling, milling or threading operations. After the neutral is in position in the insulator block, the conductor clamping screws are inserted in the corresponding openings and the structure is ready for use by an electrician for wiring in the usual manner.

Although an exemplary embodiment of the invention has been disclosed and discussed, it will be understood that other applications of the invention are possible and that the embodiment disclosed may be subjected to various changes, modifications and substitutions without necessarily departing from the spirit of the invention.

I claim as my invention:

1. A neutral terminal for an electrical distribution box comprising
   a unitary die cast metal conductor having first and second end portions and an elongated central portion,
   said central portion including a pair of spaced parallel side walls and a bottom wall and a series of generally flat transverse ribs extending between said side walls and defining square smooth walled openings therebetween, each of said side walls having aligned transverse openings in communication with corresponding square openings, said bottom wall having a width substantially equal to the space between said side walls,
   one of said end portions having parallel walls defining a square opening having an axis parallel to the axes of the square openings of said central portion, with at least one of said end portion walls having another opening in communication with the square opening in said one end portion.

2. A neutral terminal for an electrical distribution box comprising
   a unitary metal conductor having an elongate central portion joining first and second end portions, said end portions being enlarged relative to said central portion,
   said central portion including a pair of parallel side walls and a bottom wall and a series of transverse ribs defining square openings therebetween terminating at said bottom wall, said side walls having aligned transverse openings therethrough in communication with corresponding square openings,
   each of said end portions having four side walls defining a square opening having an axis parallel to the axes of the square openings of said central portion, with at least one side wall of one of said end portions having another opening in communication with the square opening in said one end portion, said square opening of each of said end portions being of larger cross-sectional area than the cross-sectional area of said square openings in said central portion.

3. A neutral terminal for an electrical distribution box comprising
   a unitary metal conductor having first and second end portions and an elongate central portion,
   said central portion including a pair of spaced parallel side walls and a bottom wall and a series of transverse ribs extending between said side walls and defining square screw receiving openings therebetween, said side walls having aligned transverse conductor receiving openings in communication with corresponding screw receiving openings,
   one of said end portions having parallel walls defining a square screw receiving opening having an axis parallel to the axes of the screw receiving openings of said central portion, with at least one of said end portion walls having another conductor receiving opening in communication with the screw receiving opening in said one end portion.

4. A neutral terminal for an electrical distribution box, including in combination:
   a unitary metal conductor having first and second end portions and an elongate central portion,
   said central portion including a pair of spaced parallel side walls and a bottom wall and a series of transverse ribs extending between said side walls defining square openings therebetween, said side walls having aligned transverse openings in communication with corresponding square openings,
   one of said end portions having parallel walls defining a square opening having an axis parallel to the axes of the square openings of said central portion, with at least one of said end portion walls having another opening in communication with the square opening in said one end portion; and
   a unitary insulator having first and second end sections and an elongate central section,
   one of said end sections having an opening aligned with the central section and slidingly receiving said conductor with said central and first and second end portions disposed in said central and first and second end sections, respectively.

5. A neutral terminal for an electrical distribution box, including in combination:
   a unitary metal conductor having first and second end portions and an elongate central portion,
   said central portion including a pair of spaced parallel side walls and a bottom wall and a series of transverse ribs extending between said side walls defining square openings therebetween, said side walls having aligned transverse openings in communication with corresponding square openings,
   one of said end portions having parallel walls defining a square opening having an axis parallel to the axes of the square openings of said central portion, with at least one of said end portion walls having another opening in communication with the square opening of said one end portion;

a unitary insulator having first and second end sections and an elongate central section, one of said end sections having an opening aligned with the central section and slidingly receiving said conductor with said central and first and second end portions disposed in said central and first and second end sections, respectively;

a plurality of screws threadedly positioned in said square openings of said conductor central portion; and another screw threadedly positioned in said square opening of said one end portion.

6. A neutral terminal for an electrical distribution box, including in combination:

a unitary metal conductor having first and second end portions and an elongate central portion, said central portion including a pair of parallel side walls and a bottom wall and a series of transverse ribs defining screw openings therebetween, said side walls having aligned transverse openings in communication with corresponding screw openings, a unitary insulator having first and second end sections and an elongate central section, one of said end sections having an opening aligned with the central section and slidingly receiving said conductor with said central and first and second end portions disposed in said central and first and second end sections, respectively, said one end section including a transverse wall overlying said conductor adjacent said central portion; and a screw disposed in the screw opening adjacent said transverse wall and engageable therewith for retaining said conductor in said insulator.

7. A neutral terminal for an electrical distribution box, including in combination:

a unitary metal conductor having an elongate central portion joining first and second end portions, said central portion including a pair of parallel side walls and a bottom wall and a series of transverse ribs defining screw openings therebetween, said side walls having aligned transverse openings in communication with corresponding screw openings, one of said said end portions having four side walls defining a screw opening having an axis parallel to the axes of the screw openings of said central portion, with at least one of said end portion walls having another opening in communication with the screw opening in said one end portion; and a unitary insulator having first and second end sections and an elongate central section, one of said end sections having an opening aligned with the central section and slidingly receiving said conductor with said central and first and second end portions disposed in said central and first and second end sections, respectively, one of said end sections having four side walls enclosing said one end portion of said conductor, with at least one of said walls of said one end section having an opening aligned with said other opening of said one end portion, said central section having a bottom wall and a side wall closing said transverse openings of said conductors at one end thereof only leaving the other ends accessible.

8. An electrical distribution box, including in combination:

a housing including a metal panel;

an insulator panel overlying said metal panel;

a pair of bus bars, each having a line terminal at one end thereof;

means for mounting said bars at said one end on said panels;

a unitary insulator having first and second end sections and an elongate central section, said central section including a pair of U-shaped receptacles which receive the other ends of said bars;

means mounting said insulator on said panels and clamping said bars thereto;

a unitary metal conductor having first and second end portions and an elongate central portion, said central portion including a pair of parallel side walls and a bottom wall and a series of transverse ribs defining square openings therebetween, said side walls having aligned transverse openings in communication with corresponding square openings, one of said end portions having parallel walls defining a square opening having an axis parallel to the axes of the square openings of said central portion, with at least one of said end portion walls having another opening in communication with the square opening in said one end portion;

one of said end sections of said insulator having an opening aligned with the central section and slidingly receiving said conductor with said central and first and second end portions disposed in said central and first and second end sections, respectively;

a plurality of screws threadedly positioned in said square openings of said conductor central portion; and another screw threadedly positioned in said square opening of said one end portion.

9. An electrical distribution box, including in combination:

a housing including a metal panel;

an insulator panel overlying said metal panel;

a pair of bus bars, each having a line terminal at one end thereof;

means mounting said bars at said one end on said panels;

a unitary insulator having first and second end sections and an elongate central section, said central section including a pair of outwardly facing U-shaped receptacles which receive the other ends of said bars;

means mounting said insulator on said panels clamping said bars thereto;

a unitary metal conductor having first and second end portions and an elongate central portion, said central portion including a pair of parallel side walls and a bottom wall and a series of transverse ribs defining screw openings therebetween, said side walls having aligned transverse openings in communication with corresponding screw openings;

one of said end sections of said insulator having an opening aligned with the central section and slidingly receiving said conductor with said central and first and second end portions disposed in said central and first and second end sections, respectively; and a plurality of screws threadedly positioned in said screw openings of said conductor central portion.

10. An electrical distribution box, including in combination:

a housing including a metal panel;

an insulator panel overlying said metal panel;

a pair of bus bars, each having a line terminal at one end thereof;

means mounting said bars at said one end on said panels;

a unitary insulator having first and second end sections and an elongate central section, said central section including a pair of U-shaped receptacles for receiving the other ends of said bars;

means mounting said insulator on said panels clamping said bars thereto;

a unitary metal conductor having first and second end portions and an elongate central portion, said central portion including a pair of parallel side walls and a bottom wall and a series of transverse ribs defining screw openings therebetween, said side walls having aligned transverse openings in communication with corresponding screw openings;

one of said end sections of said insulator having an opening aligned with the central section and slidingly receiving said conductor with said central and first and second end portions disposed in said central and first and second end sections, respectively, said one section including a transverse wall overlying said conductor adjacent said central portion; and a screw positioned in said screw opening of said conductor central portion adjacent said transverse wall and engageable therewith for retaining said conductor in said insulator.

References Cited by the Examiner
UNITED STATES PATENTS

| | | | |
|---|---|---|---|
| 1,943,660 | 1/1934 | Edwards | 339—242 |
| 2,107,416 | 2/1938 | Huth | 339—22 X |
| 2,790,113 | 4/1957 | Brown | 339—22 X |
| 2,980,824 | 4/1961 | Kobryner | 317—119 X |
| 3,001,172 | 9/1961 | Cornel | 339—198 X |
| 3,133,779 | 5/1964 | Stanback | 339—242 |
| 3,171,708 | 3/1965 | Salomone | 339—198 |

FOREIGN PATENTS 781,246  8/1957  Great Britain.

LARAMIE E. ASKIN, *Primary Examiner.*
JOHN F. BURNS, *Examiner.*
W. B. FREDRICKS, *Assistant Examiner.*